US007434063B2

(12) United States Patent
Watanabe

(10) Patent No.: US 7,434,063 B2
(45) Date of Patent: Oct. 7, 2008

(54) AUTHENTICATION METHOD, APPARATUS, AND SYSTEM

(75) Inventor: Isao Watanabe, Hamura (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 874 days.

(21) Appl. No.: 10/263,198

(22) Filed: Oct. 3, 2002

(65) Prior Publication Data

US 2003/0084289 A1 May 1, 2003

(30) Foreign Application Priority Data

Oct. 24, 2001 (JP) .............................. 2001-326637

(51) Int. Cl.
*H04K 1/00* (2006.01)
*G06F 7/04* (2006.01)
(52) U.S. Cl. .......................... 713/186; 726/21; 726/16; 726/27
(58) Field of Classification Search ................. 713/161, 713/168, 170, 186; 726/21, 16, 27
See application file for complete search history.

(56) References Cited

U.S. PATENT DOCUMENTS

| | | | | | |
|---|---|---|---|---|---|
| 5,375,244 | A | * | 12/1994 | McNair ........................ | 710/200 |
| 5,513,272 | A | * | 4/1996 | Bogosian, Jr. ................ | 382/116 |
| 5,648,648 | A | * | 7/1997 | Chou et al. ................... | 235/382 |
| 5,761,309 | A | * | 6/1998 | Ohashi et al. ................. | 713/156 |
| 5,790,667 | A | * | 8/1998 | Omori et al. .................. | 705/78 |
| 5,930,804 | A | * | 7/1999 | Yu et al. ..................... | 707/104.1 |
| 6,067,620 | A | * | 5/2000 | Holden et al. ................. | 713/155 |
| 6,067,621 | A | * | 5/2000 | Yu et al. ........................ | 713/172 |
| 6,073,234 | A | * | 6/2000 | Kigo et al. .................... | 713/161 |
| 6,160,903 | A | * | 12/2000 | Hamid et al. ................. | 382/115 |
| 6,256,737 | B1 | * | 7/2001 | Bianco et al. ................. | 713/186 |
| 6,353,888 | B1 | * | 3/2002 | Kakehi et al. ................. | 713/168 |
| 6,516,413 | B1 | * | 2/2003 | Aratani et al. ............... | 713/170 |
| 6,574,730 | B1 | * | 6/2003 | Bissell et al. ................ | 713/168 |
| 6,615,352 | B2 | * | 9/2003 | Terao et al. .................. | 713/184 |
| 6,697,947 | B1 | * | 2/2004 | Matyas et al. ................ | 713/182 |
| 6,704,787 | B1 | * | 3/2004 | Umbreit ...................... | 709/229 |
| 6,745,326 | B1 | * | 6/2004 | Wary .......................... | 713/168 |
| 6,751,734 | B1 | * | 6/2004 | Uchida ........................ | 713/186 |
| 6,754,825 | B1 | * | 6/2004 | Lennie et al. ................ | 713/181 |

(Continued)

FOREIGN PATENT DOCUMENTS

JP 10-137221 5/1998

OTHER PUBLICATIONS

Notification of Reasons for Rejection issued by JPO, mailed Jan. 25, 2005, for Japanese Patent Application No. 2001-326637, and English-language translation thereof.

*Primary Examiner*—Emmanuel L Moise
*Assistant Examiner*—Techane J Gergiso
(74) *Attorney, Agent, or Firm*—Finnegan, Henderson, Farabow, Garrett & Dunner, L.L.P.

(57) ABSTRACT

In an authentication apparatus, at least one authentication program corresponding to an authentication method of the user's choice executes an authentication process based on data received from a sensor unit and personal feature data. An authentication determination program calculates a comprehensive authentication level value of such an authentication method on the basis of authentication evaluation data. When the calculated comprehensive authentication level value has exceeded the predetermined authentication level, the authentication determination program determines that authentication has succeeded; otherwise, the program determines that authentication has failed.

5 Claims, 10 Drawing Sheets

U.S. PATENT DOCUMENTS

| | | | |
|---|---|---|---|
| 6,766,306 B1 * | 7/2004 | Matsuyama | 705/53 |
| 6,836,845 B1 * | 12/2004 | Lennie et al. | 713/181 |
| 6,853,988 B1 * | 2/2005 | Dickinson et al. | 705/75 |
| 6,857,073 B2 * | 2/2005 | French et al. | 713/168 |
| 6,915,426 B1 * | 7/2005 | Carman et al. | 713/168 |
| 6,944,765 B1 * | 9/2005 | Rose et al. | 713/181 |
| 6,981,145 B1 * | 12/2005 | Calvez et al. | 713/170 |
| 6,990,588 B1 * | 1/2006 | Yasukura | 713/186 |
| 7,187,771 B1 * | 3/2007 | Dickinson et al. | 380/228 |
| 7,216,361 B1 * | 5/2007 | Roskind et al. | 726/9 |
| 7,254,619 B2 * | 8/2007 | Mekata et al. | 709/217 |
| 2001/0009026 A1 * | 7/2001 | Terao et al. | 713/170 |
| 2001/0010720 A1 * | 8/2001 | Kimball et al. | 380/241 |
| 2002/0013900 A1 * | 1/2002 | Ibuki | 713/168 |
| 2002/0120846 A1 * | 8/2002 | Stewart et al. | 713/168 |
| 2003/0056096 A1 * | 3/2003 | Albert et al. | 713/168 |
| 2003/0084289 A1 * | 5/2003 | Watanabe | 713/168 |

* cited by examiner

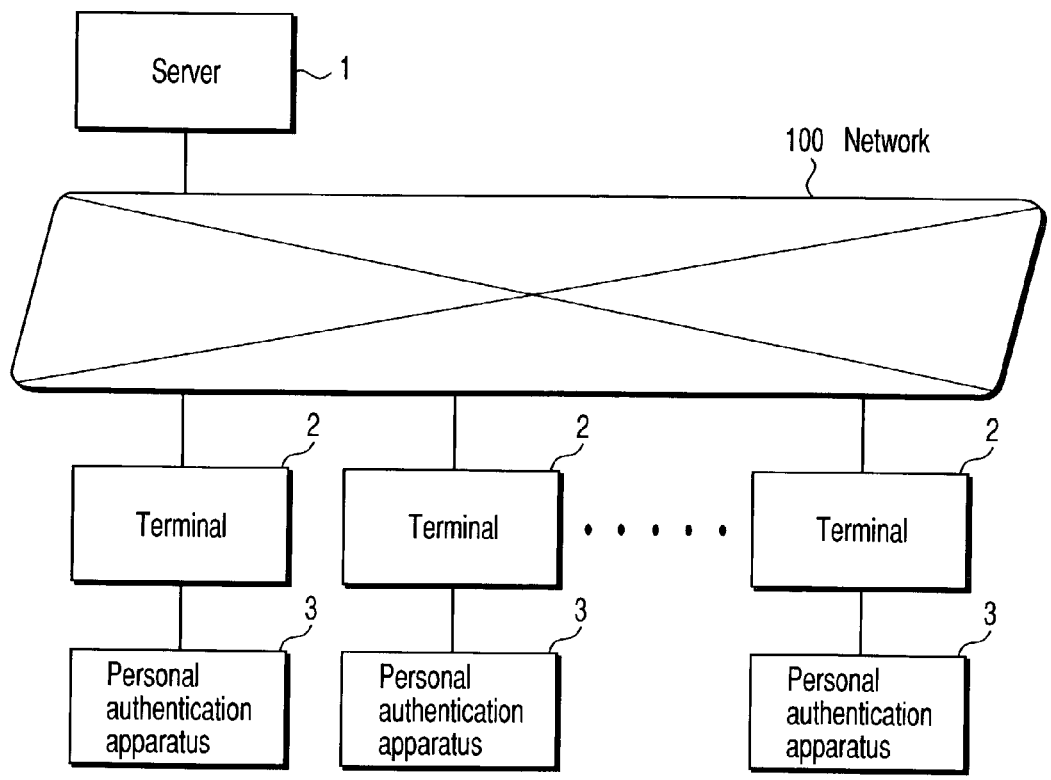

FIG. 1

| Authentication method | | Authentication level value |
|---|---|---|
| Authentication based on knowledge / article | Personal identification number (4 digits) | 1 |
| | Personal identification number (6 digits) | 3 |
| | Password (selected by user) | 2 |
| | Password (random character string) | 4 |
| | IC card | 7 |
| Biological authentication | Voiceprint (1 word) | 1 |
| | Voiceprint (5 words) | 3 |
| | Fingerprint (8 feature points) | 2 |
| | Fingerprint (16 feature points) | 4 |
| | Face still image | 2 |
| | Face moving image (word utterance) | 4 |
| | Iris | 6 |

FIG. 3

| Authentication method | | | Authentication level value |
|---|---|---|---|
| Authentication based on knowledge / article | Personal identification number ( 4 digits ) | | 1 |
| | Personal identification number ( 6 digits ) | | 3 |
| | Password ( selected by user ) | | 2 |
| | Password ( random character string ) | | 4 |
| | A company IC card | | 5 |
| | B company IC card | | 7 |
| Biological authentication | C company apparatus | Voiceprint | 1 |
| | | Fingerprint | 2 |
| | | Face still image | 2 |
| | D company apparatus | Voiceprint | 3 |
| | | Fingerprint | 4 |
| | | Face moving image | 4 |
| | E company apparatus | Iris | 6 |

FIG. 9

AUTHENTICATION METHOD, APPARATUS, AND SYSTEM

CROSS-REFERENCE TO RELATED APPLICATIONS

This application is based upon and claims the benefit of priority from the prior Japanese Patent Application No. 2001-326637, filed Oct. 24, 2001, the entire contents of which are incorporated herein by reference.

BACKGROUND OF THE INVENTION

1. Field of the Invention

The present invention relates to an authentication method, apparatus, and system for authenticating users who use terminals, which are equipped at respective places so as to offer various services and, more particularly, to an authentication method, apparatus, and system, which can implement efficient, highly accurate personal authentication by combining a plurality of authentication schemes.

2. Description of the Related Art

In recent years, there is growing interest in security, and various personal authentication schemes such as password input upon starting up a personal computer, personal identification number input upon using an ATM (Automated Teller Machine) terminal in a bank, fingerprint or retinal pattern verification in room entrance management, and the like have been developed.

Upon building a system that offers various services by setting terminals at respective places, the system developer selects and introduces an authentication scheme for authenticating users who use the terminals in consideration of merits and demerits, cost, and the like of various authentication schemes.

In an authentication scheme that exploits a biological feature such as a fingerprint, a retinal pattern, or the like, a specific person tends to repeatedly cause authentication errors. That is, a person, who has a feature that readily causes authentication errors in a portion of an object to be authenticated by that authentication system, can seldom access such a system which adopts that authentication scheme. Normally, since the authentication scheme is permanently installed in the system, it is difficult to take a measure, e.g., to replace that authentication scheme by another one. Therefore, in consideration of such users, the system preferably has a mechanism that allows the user to select a desired one of a plurality of authentication schemes.

However, it is not always preferable to allow the user to select a desired authentication scheme in terms of security against access by illicit users. For example, the system may always allow an illicit user who has knowledge to attack a weak point of an authentication scheme with low authentication accuracy to select such an authentication scheme.

The present invention has been made in consideration of the above situation, and has as its embodiment to provide an authentication method, apparatus, and system, which can implement efficient, highly accurate personal authentication by combining a plurality of authentication schemes.

BRIEF SUMMARY OF THE INVENTION

In order to achieve the above embodiment, the present invention may provide an authentication method using a plurality of authentication processes, which are respectively set with first values, comprising calculating a second value of the authentication method on the basis of the first value; and determining whether the authentication is successful, based on the calculated second value.

Since this authentication method has a plurality of authentication processes and calculates a comprehensive evaluation value for them, a user who readily causes an authentication error by a specific authentication processes can be relieved, and authentication accuracy required as a successful authentication condition is reliably guaranteed.

If several authentication processes are randomly selected for each authentication as a combination that can guarantee the authentication accuracy required as a successful authentication condition, higher security can be maintained.

Additional embodiment and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently embodiments of the invention, and together with the general description given above and the detailed description of the embodiments given below, serve to explain the principles of the invention.

FIG. 1 is an overall diagram of a personal authentication system according to a first embodiment of the present invention;

FIG. 3 is a table showing an example of authentication evaluation data held by a program unit of the personal authentication apparatus of the first embodiment;

FIG. 9 is a table showing an example of authentication evaluation data held by a program unit of the authentication apparatus of the second embodiment;

DETAILED DESCRIPTION OF THE INVENTION

Figure 2:
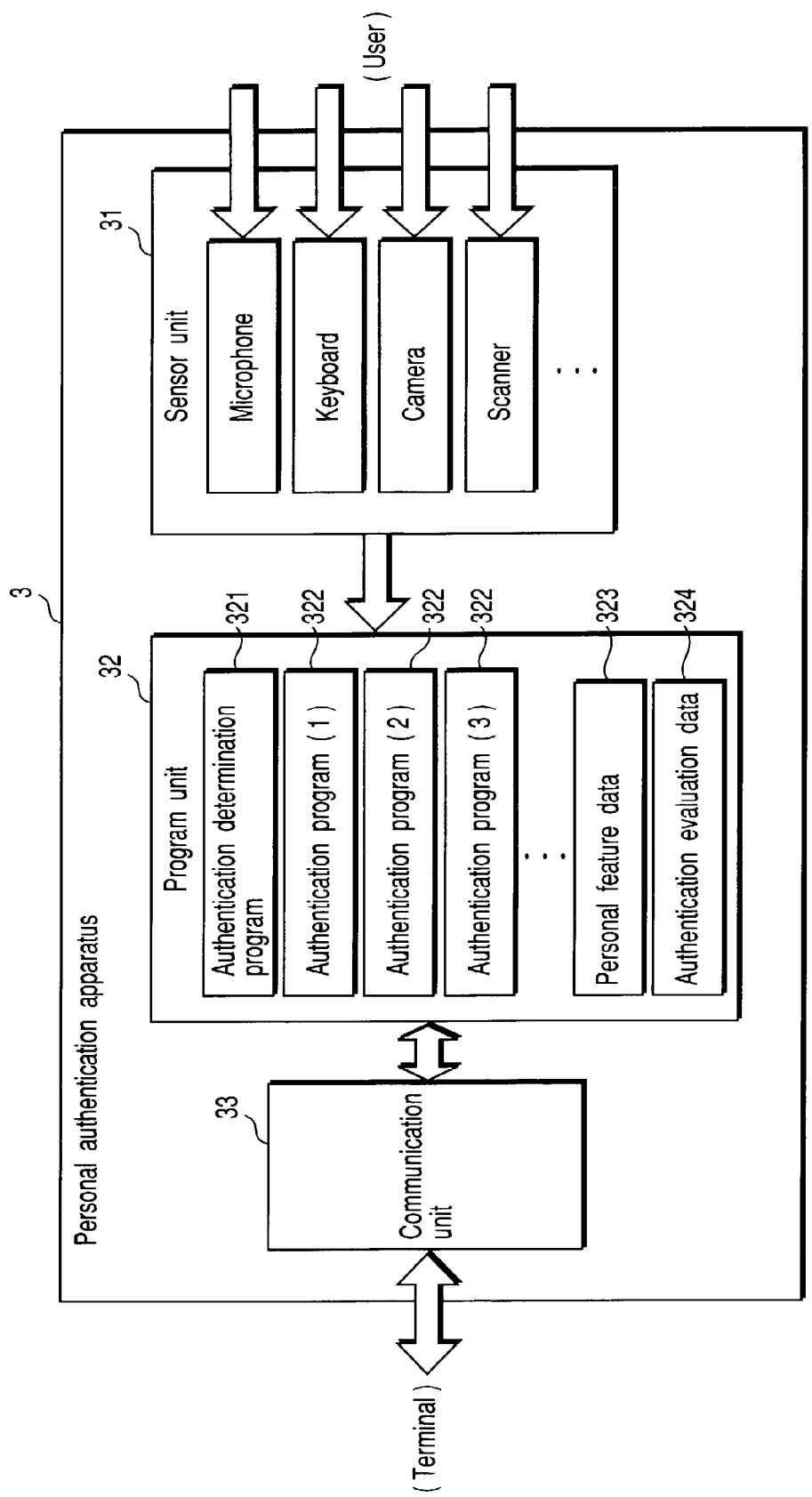
FIG. 2 is a functional block diagram of a personal authentication apparatus of the first embodiment.

Embodiments of the present invention will be described hereinafter with reference to the accompanying drawings.

FIRST EMBODIMENT

The first embodiment of the present invention will be described first. FIG. 1 is an overall diagram of a personal authentication system according to the first embodiment.

As shown in FIG. 1, in this personal authentication system, a server 1 and a plurality of terminals 2 are connected via a network 100, and each terminal 2 has a personal authentication apparatus 3.

The server 1 offers various services to users of the terminals 2 via the network 100. Conversely, each terminal 2 is operated by the users to receive various services offered by the server 1. Upon using various services, each terminal 2 executes an authentication process for authenticating each user using the personal authentication apparatus 3. FIG. 2 is a functional block diagram of this personal authentication apparatus 3.

As shown in FIG. 2, the personal authentication apparatus 3 has a sensor unit 31, program unit 32, and communication unit 33.

The sensor unit 31 comprises input devices used to input data required for personal authentication. The input devices include a microphone for inputting a voice used in voiceprint authentication, a keyboard for inputting a personal identification number or password, a camera for inputting a face image, a scanner for inputting fingerprints, a retinal pattern, or the like, and the like.

The program unit 32 serves as a data processor that executes authentication processes using data acquired by the sensor unit 31, and includes an authentication determination program 321 for comprehensively checking if personal authentication is successful, various authentication programs 322 for implementing unique authentication processes, personal feature data 323 with reference to which each authentication program authenticates a user, and authentication evaluation data 324 that numerically express the security levels of individual authentication processes.

As for the authentication programs 322, a plurality of authentication programs with different feature extraction methods may be available for an identical input. For example, in the case of a face image, an authentication program that extracts a feature, e.g., lip movements as a moving image may be available in addition to an authentication program that extracts a feature from a still image.

The communication unit 33 sends the checking result of the authentication determination program 321 to the terminal 2, and also encrypts communication to strengthen the security of authentication.

FIG. 3 is a table showing an example of the authentication evaluation data held by the program unit 32 of the personal authentication apparatus 3.

Figure 4:
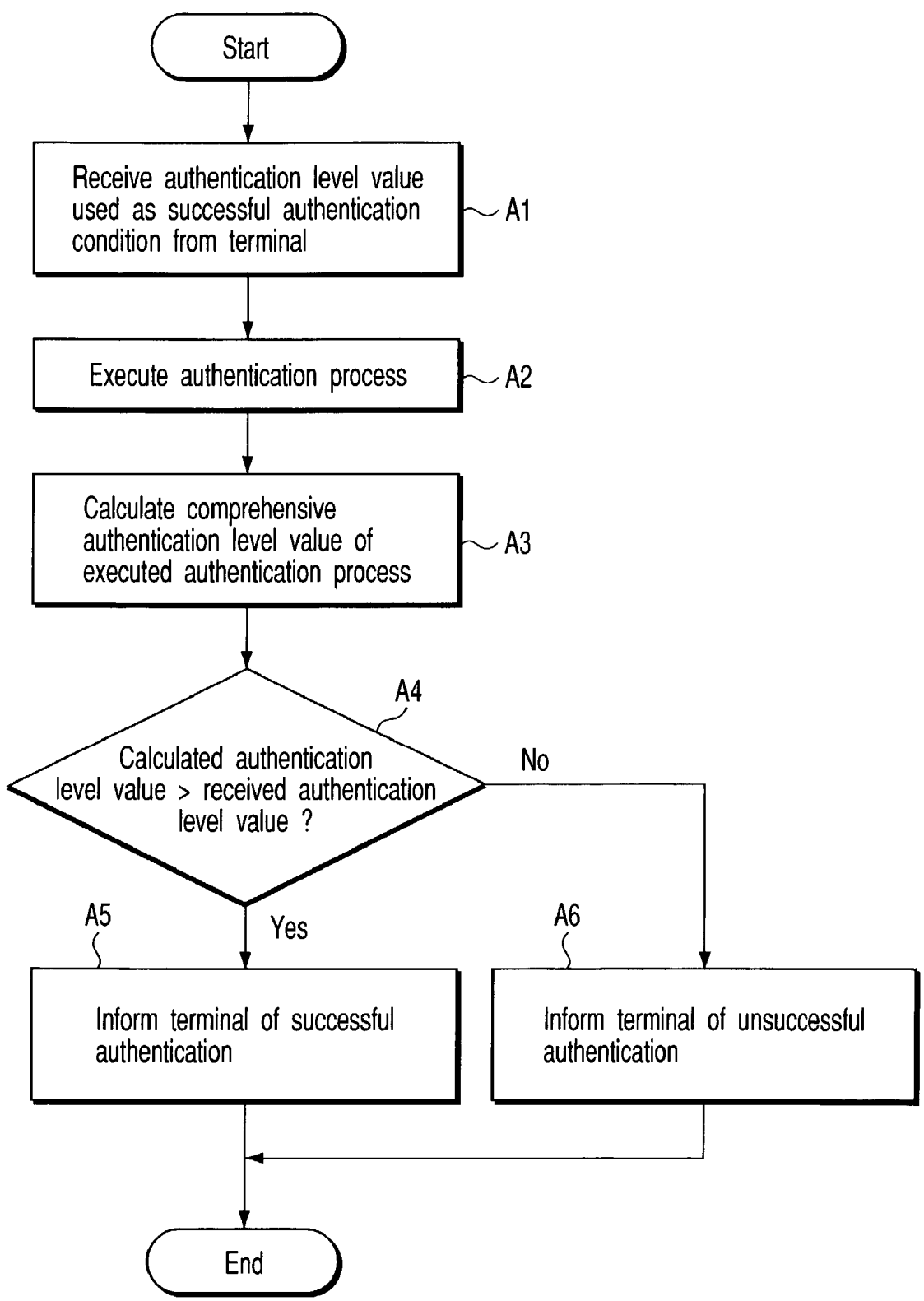
FIG. 4 is a flowchart showing the operation sequence upon executing authentication processes by the personal authentication apparatus of the first embodiment.

In the example shown in FIG. 4, authentication level 1 is set for an authentication method ("personal identification number (4 digits)") that makes the user input a 4-digit numerical value from the keyboard, and authentication level 3 is set for an authentication method ("personal identification number (6 digits)") that makes the user input a 6-digit numerical value from the keyboard. This authentication level indicates that authentication accuracy receives higher evaluation with increasing numerical value. On the other hand, authentication level 3 is set for an authentication method ("password (selected by user)") that makes the user input a character string arbitrarily selected by himself or herself from the keyboard, and authentication level 4 is set for an authentication method ("password (random character string)") that makes the user input a so-called random character string set by a service provider from the keyboard. Also, authentication level 7 is set for an authentication method ("IC card") that makes the user insert an IC card issued by the service provider.

In addition to these authentication methods that authenticate users based on their knowledge or articles such as a personal identification number, password, IC card, and the like, authentication methods that authenticate the users by measuring biological information such as a voiceprint, fingerprint, and the like are available. In this embodiment, authentication level 1 is set for an authentication method ("voiceprint (1 word)") that makes the user utter one word, and authentication level 3 is set for an authentication method ("voiceprint (5 words)") that makes the user utter five words or a sentence including them. Authentication level 2 is set for an authentication method ("fingerprint (8 feature points)") that samples eight data values from an input fingerprint, and authentication level 4 is set for an authentication method ("fingerprint (16 feature points)") that samples 16 data values from an input fingerprint. Likewise, authentication level 2 is set for an authentication method ("face still image") that inputs a face still image, and authentication level 4 is set for an authentication method ("face moving image (word utterance)") that inputs a face moving image upon uttering a predetermined word. Furthermore, authentication level 6 is set for an authentication method ("iris") that inputs the iris pattern of an eye.

This personal authentication apparatus 3 is characterized in that the authentication determination program 321 calculates a comprehensive evaluation value of a plurality of authentication processes executed by the authentication programs 322 using the authentication evaluation data 324, and it is determined if authentication is successful. For example, when an authentication level value required as a successful authentication condition is 5, and when the user inputs a 6-digit personal identification number and utters five words, and two authentication processes based on these inputs have succeeded, the authentication determination program 321 adds up the authentication level values of these authentication processes to obtain a comprehensive authentication level value=6, and determines that this authentication is successful. In this connection, each of these two authentication methods does not solely meet the successful authentication condition (authentication level value=3); if it is determined based on only one authentication result that authentication is successful, the authentication accuracy is impaired considerably.

The operation sequence upon executing authentication processes in the personal authentication apparatus 3 will be explained below with reference to FIG. 4. FIG. 4 is a flowchart showing the operation sequence upon executing authentication processes in the personal authentication apparatus 3.

Upon executing the authentication process, in this personal authentication apparatus 3, the authentication determination program 321 receives an authentication level value as a successful authentication condition from the terminal 2 (step A1). The authentication programs 322 corresponding to authentication methods of user's choice respectively execute authentication processes on the basis of data received from the sensor unit 31 and the personal feature data 323 (step A2).

The authentication determination program 321 calculates a comprehensive authentication level value of these authentication methods on the basis of the authentication evaluation data 324 (step A3), and checks if the calculated comprehensive authentication level value has exceeded the authentication level value received from the terminal 2 (step A4).

If the calculated comprehensive authentication level value has exceeded the authentication level value received from the terminal 2 (YES in step A4), the authentication determination program 321 informs the terminal 2 that authentication has succeeded (step A5); otherwise (NO in step A4), the program 321 informs the terminal that authentication has failed (step A6).

In this manner, since the personal authentication apparatus 3 comprises a plurality of authentication programs 322 corresponding to various authentication methods, a user who readily causes an authentication error in a predetermined authentication method can be relieved. At the same time, since the authentication determination program 321 calculates a comprehensive authentication level value of a plurality of authentication methods, and determines if authentication is successful, the authentication accuracy required by the terminal 2 can be reliably assured.

Figure 5:
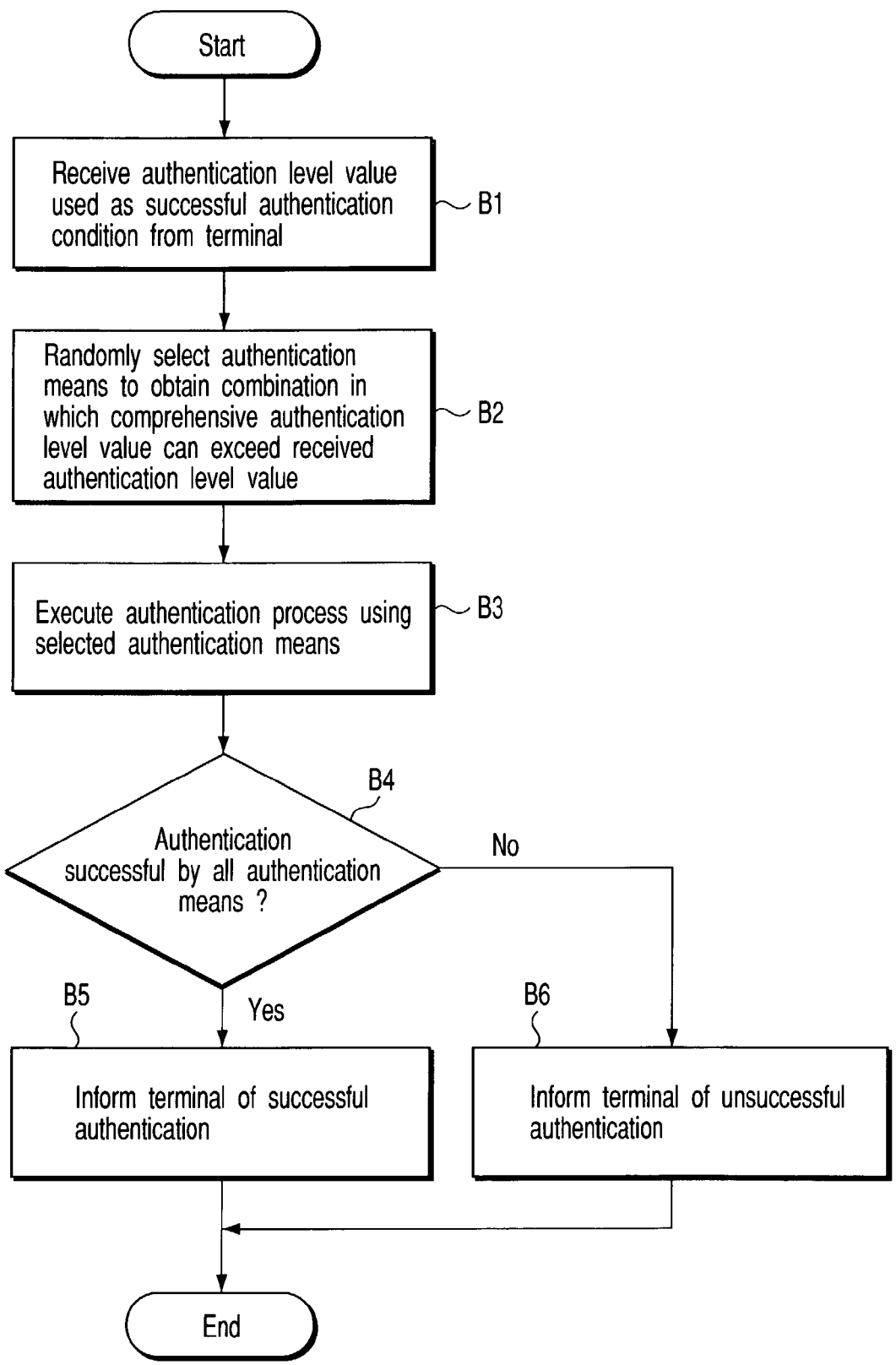
FIG. 5 is a flowchart showing the operation sequence (modification) upon executing authentication processes by the personal authentication apparatus of the first embodiment.

In the operation sequence of the authentication process shown in FIG. 4, the user arbitrarily selects authentication methods. Also, the authentication determination program 321 may randomly select authentication methods for each authentication to obtain a combination of methods, the sum of authentication values of which can exceed an authentication level value received from the terminal 2. FIG. 5 is a flowchart showing the operation sequence upon executing authentication processes in the personal authentication apparatus 3 in such a case.

In this case, the authentication determination program 321 receives an authentication level value as the successful authentication condition from the terminal 2 (step B1). Also, the authentication determination program 321 randomly selects authentication methods to obtain a combination of methods, the sum of authentication values of which can exceed the authentication level value received from the terminal 2 (step B2).

The authentication determination program 321 then controls the authentication programs 322 corresponding to the selected authentication methods to execute authentication processes (step B3), and checks if all these authentication processes have succeeded (step B4).

If all the authentication processes have succeeded (YES in step B4), the authentication program 321 informs the terminal 2 that authentication has succeeded (step B5); otherwise (NO in step B4), the program 321 informs the terminal 2 that authentication has failed (step B6).

In this way, since the personal authentication apparatus 3 randomly selects some authentication methods for each authentication to obtain a combination of methods, the sum of authentication values of which can exceed an authentication level value received from the terminal 2, high security can be maintained.

Note that the user need not always recognize the selection results of the authentication determination program 321. That is, the program makes the user perform operations according to a predetermined sequence to acquire a set of data, and controls selection/non-selection and processing methods of these data for each authentication in the personal authentication apparatus 3. For example, the program always makes the user utter some words, and executes authentication based on the voiceprint at one time or a face moving image at another time. In this way, various methods are available.

SECOND EMBODIMENT

Figure 6:
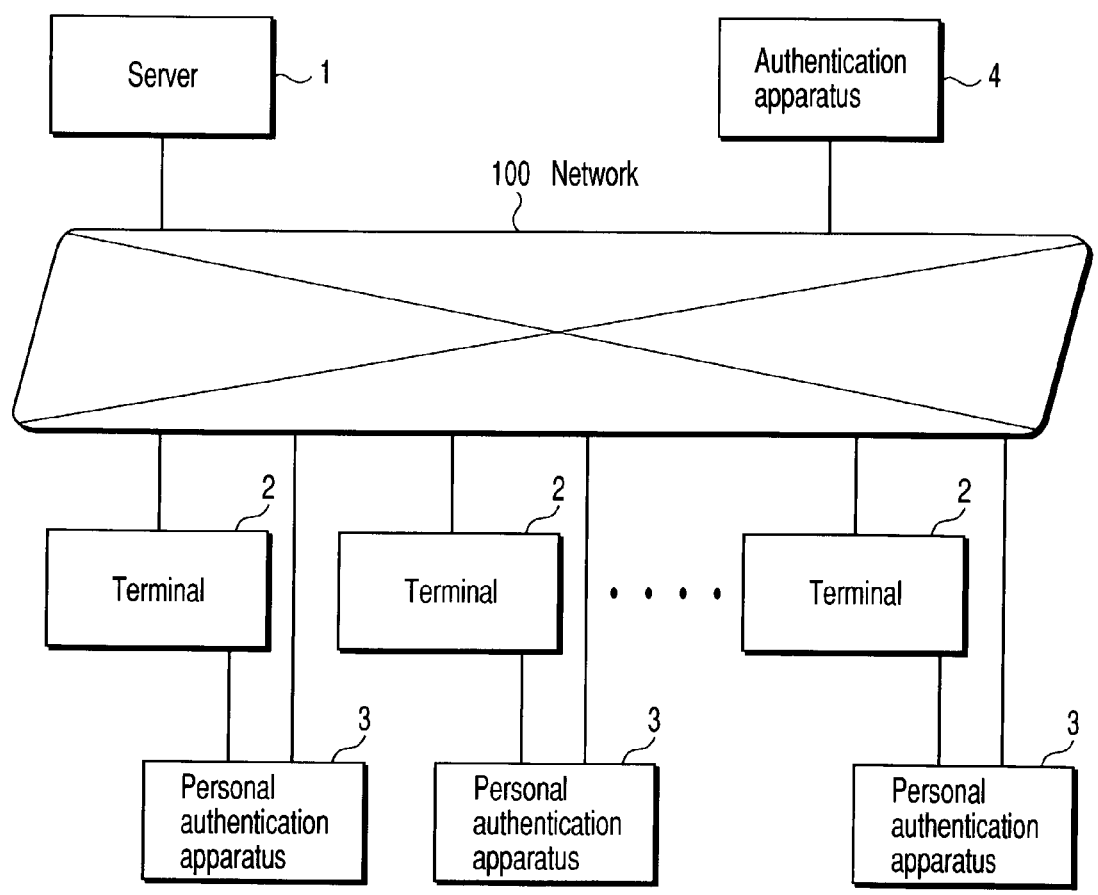
FIG. 6 is an overall diagram of a personal authentication system according to a second embodiment of the present invention.

The second embodiment of the present invention will be described below. FIG. 6 is an overall diagram of a personal authentication system according to the second embodiment.

The difference between the personal authentication systems of the second and first embodiments lies in that an authentication apparatus 4 is added, and the personal authentication apparatuses 3 are connected to the network 100. The authentication apparatus 4 executes authentication processes, which are executed by each personal authentication apparatus 3 in the first embodiment, instead.

Figure 7:
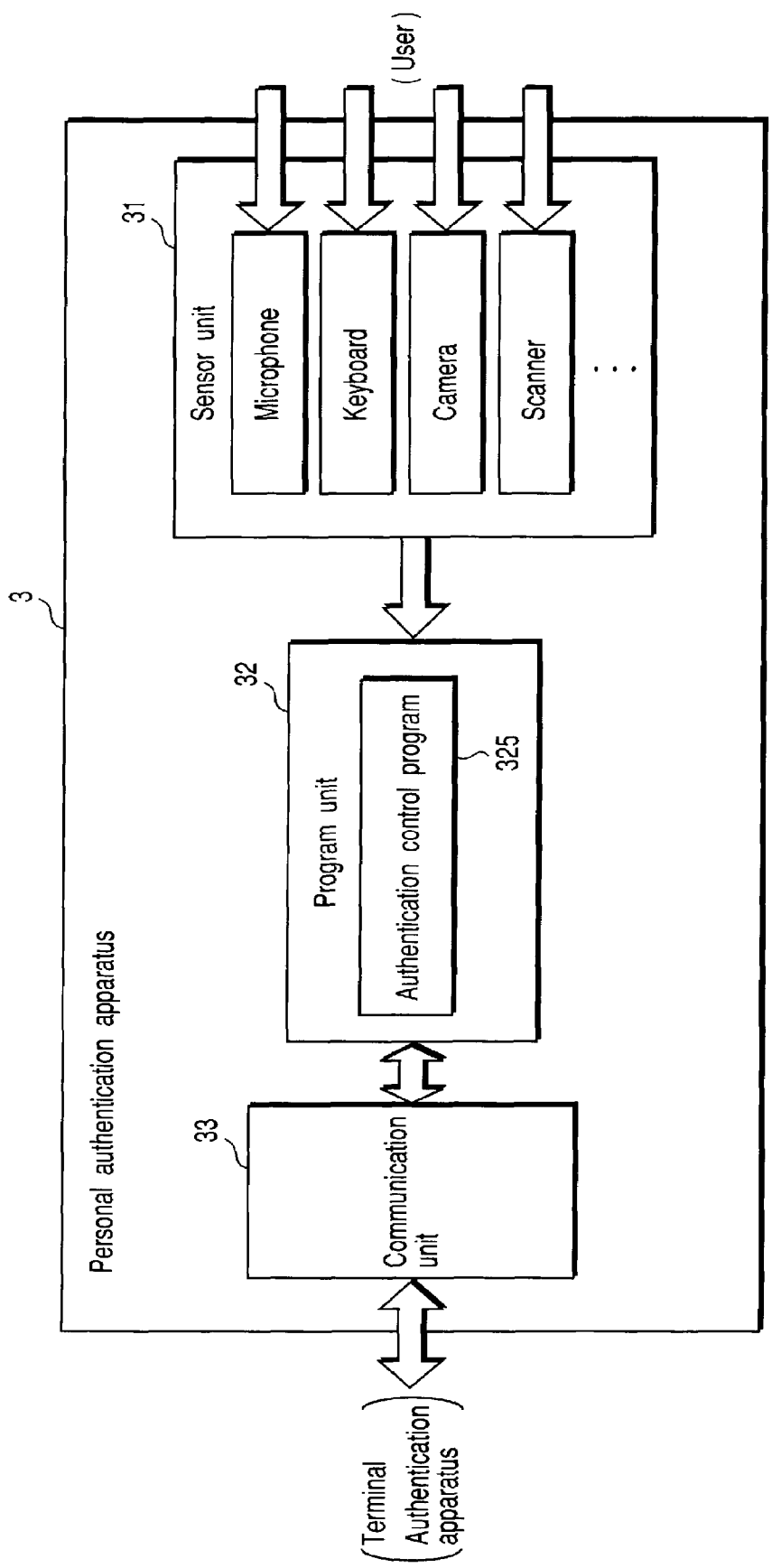
FIG. 7 is a functional block diagram of a personal authentication apparatus of the second embodiment.
Figure 8:
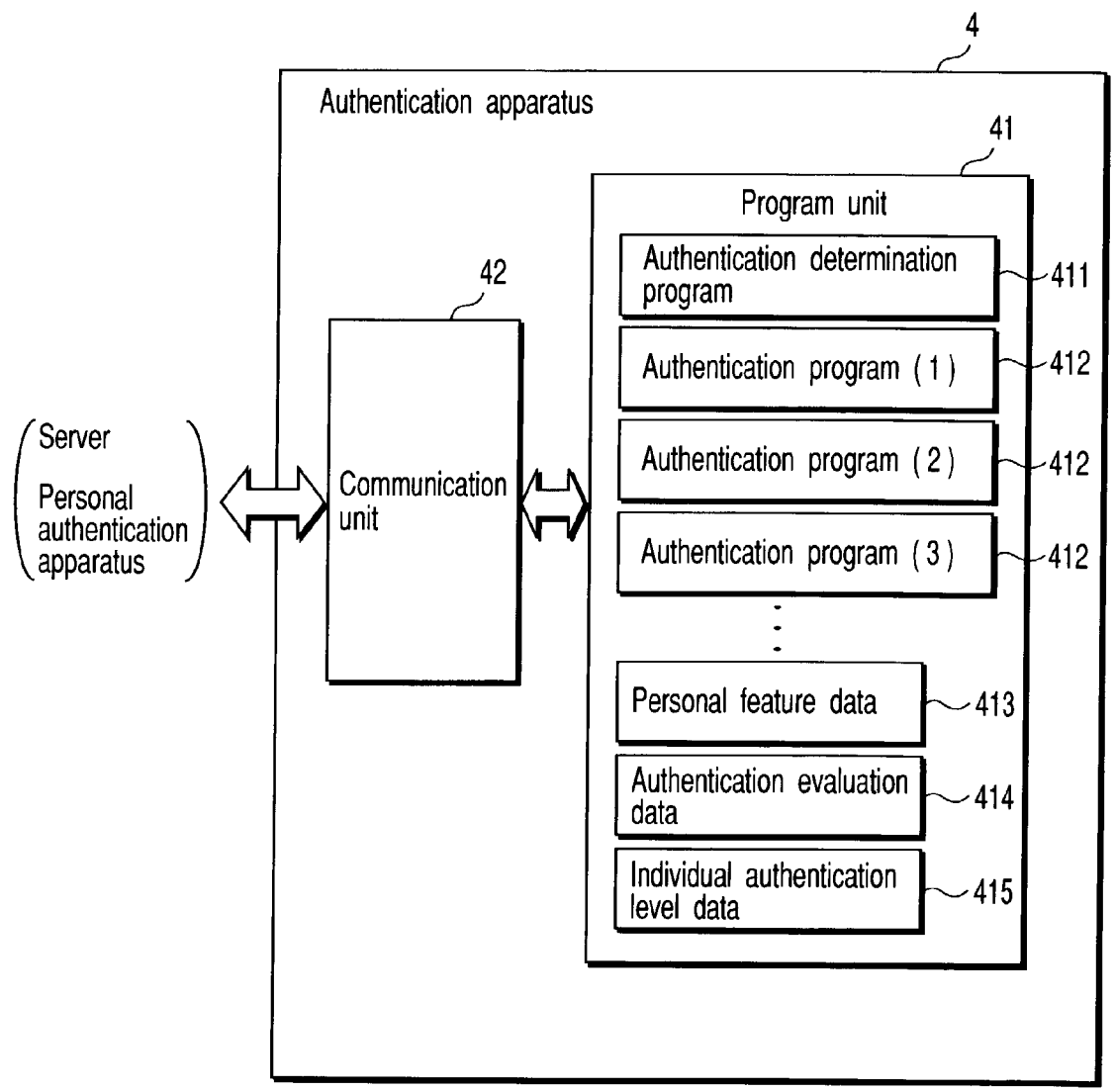
FIG. 8 is a functional block diagram of an authentication apparatus of the second embodiment.

FIG. 7 is a functional block diagram of the personal authentication apparatus 3 of the second embodiment, and FIG. 8 is a block diagram of the authentication apparatus 4.

As shown in FIG. 7, the personal authentication apparatus 3 of the second embodiment has a sensor unit 31, program unit 32, and communication unit 33 as in the first embodiment. The difference from the personal authentication apparatus 3 of the first embodiment is the configuration of the program unit 32, which comprises an authentication control program 325 alone.

The authentication control program 325 sends data acquired by the sensor unit 31 to the authentication apparatus 4, receives authentication process results based on these data, i.e., information indicating if authentication has succeeded, and sends to the terminal 2 that information indicating if authentication has succeeded.

The authentication apparatus 4 has a program unit 41 and communication unit 42, as shown in FIG. 8.

The program unit 41 corresponds to the program unit 32 of the personal authentication apparatus 3 of the first embodiment, and serves as a data processor for executing authentication processes using data sent from the personal authentication apparatus 3. The program unit 41 includes an authentication determination program 411 for comprehensively checking if personal authentication is successful, various authentication programs 412 for implementing unique authentication processes, personal feature data 413 with reference to which each authentication program authenticates a user, authentication evaluation data 414 that numerically express the security levels of individual authentication processes, and individual authentication level data 415 which are set for respective users. The setup/update processes of the individual authentication level data 415 are managed in accordance with instructions from the server 1 as a provider of various services.

The communication unit 42 sends the authentication result of the authentication determination program 411 to the terminal 2, and also encrypts communication to strengthen the security of authentication.

FIG. 9 is a table showing an example of the authentication evaluation data 414 held by the program unit 41 of the authentication unit 4.

As shown in FIG. 9, the authentication evaluation data 414 include information used to further differentiate the types of personal authentication apparatuses 3 for acquiring biological information, in addition to the authentication evaluation data 324 of the first embodiment shown in FIG. 3. More specifically, information is held that sets an authentication level value=1 when a voice, required in an authentication method that makes the user utter a given word, is acquired by a personal authentication apparatus 3 manufactured by C company, or sets an authentication level value=3 when that voice is acquired by a personal authentication apparatus 3 manufactured by D company.

Figure 10:
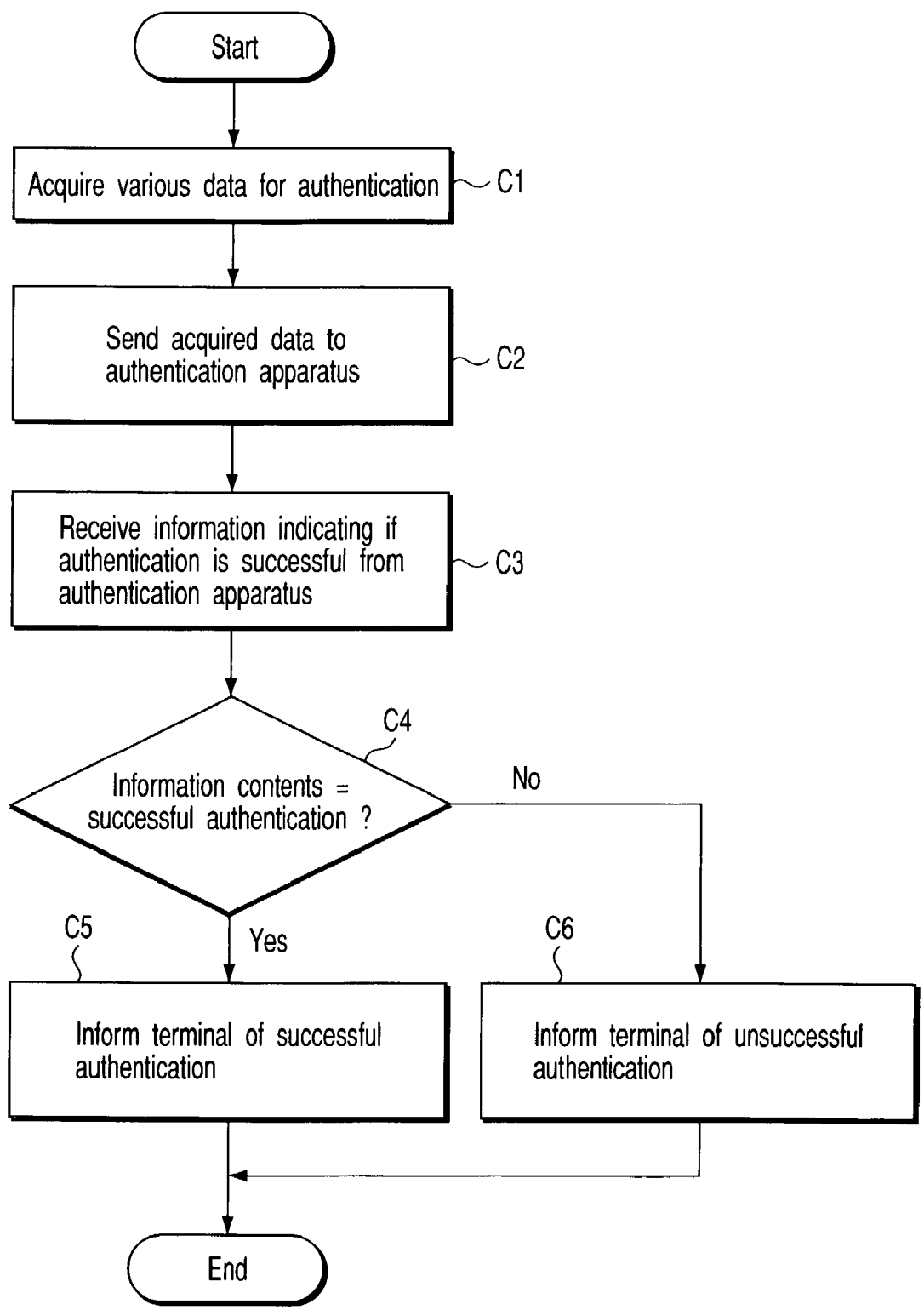
FIG. 10 is a flowchart showing the operation sequence upon executing authentication processes by the personal authentication apparatus of the second embodiment.

The operation sequence of the personal authentication system of the second embodiment will be described below with reference to FIGS. 10 and 11. FIG. 10 is a flowchart showing the operation sequence upon executing authentication processes in the personal authentication apparatus 3, and FIG. 11 is a flowchart showing the operation sequence upon executing authentication processes in the authentication apparatus 4.

The personal authentication apparatus 3 acquires various data for authentication using the sensor unit 31 (step C1 in FIG. 10), and the authentication control program 325 sends these data to the authentication apparatus 4 (step C2). After that, the authentication control program 325 waits for reception of information indicating if authentication is successful, which is sent back from the authentication apparatus 4.

Upon receiving the information from the authentication apparatus 4 (step C3), if the contents of the received information indicate that authentication has succeeded (YES in step C4), the authentication control program 325 informs the terminal 2 that authentication has succeeded (step C5); otherwise (NO in step C4), the program 325 informs the terminal 2 that authentication has failed (step C6).

Figure 11:
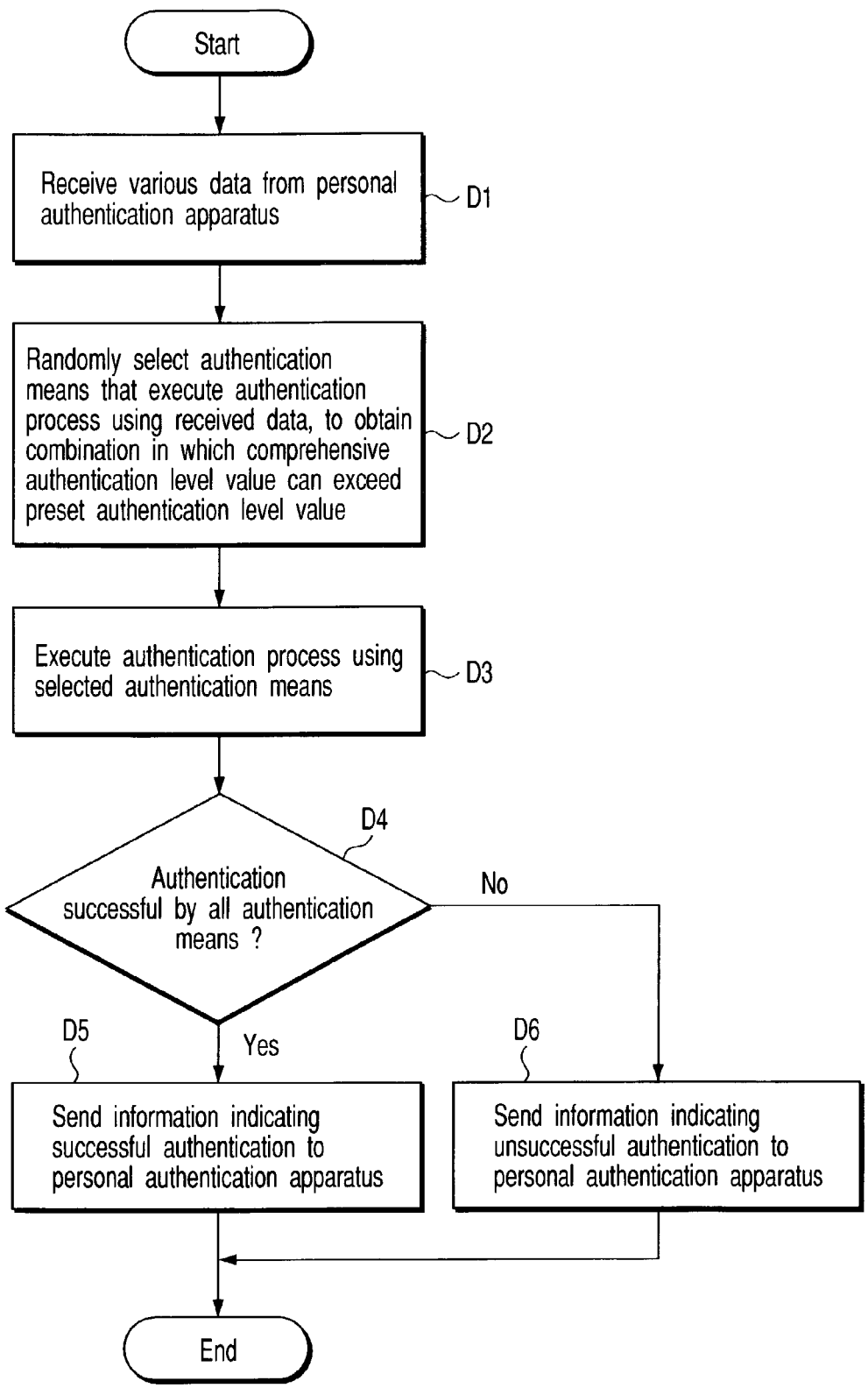
FIG. 11 is a flowchart showing the operation sequence of upon executing authentication processes by the personal authentication apparatus of the second embodiment.

On the other hand, in the authentication apparatus 4, the authentication determination program 411 receives various data for authentication from the personal authentication apparatus 3 (step D1 in FIG. 11). The authentication determination program 411 randomly selects some of the authentication methods that execute authentication processes using various data received from the personal authentication apparatus 3 to obtain a combination of methods, the sum of authentication level values of which exceeds an authentication level value in the individual authentication level data 415, which is set for each user to be authenticated, on the basis of the authentication evaluation data 414 (step D2).

The authentication determination program 411 then controls the authentication programs 412 corresponding to the selected authentication methods to execute authentication processes (step D3), and checks if all these authentication processes have succeeded (step D4).

If all the authentication processes have succeeded (YES in step D4), the authentication program 411 sends information indicating that authentication has succeeded to the personal authentication apparatus 3 (step D5); otherwise (NO in step D4), the program 411 sends information indicating that authentication has failed to the personal authentication apparatus 3 (step D6).

In the personal authentication system of the second embodiment, since the authentication apparatus 4 executes authentication processes in place of each personal authentication apparatus 3, these authentication processes are separated from the personal authentication apparatus 3. In this way, upon building a system in which the terminals 2 are set at respective places, and the server 1 offers various services via the network 100, the system developer need not permanently install authentication schemes in that system. Therefore, not only the load on development is reduced, but also when a new authentication scheme that can implement authentication with higher authentication accuracy using data acquired by each personal authentication apparatus 3 is developed, that authentication scheme can be applied to the system without any modifications.

Since the authentication level values are differentiated in accordance with the types of personal authentication apparatuses 3, an authentication level value required as a successful authentication condition can be practically assured independently of the type of personal authentication apparatus 3 used. That is, in the personal authentication system of the second embodiment, when a new model of the personal authentication apparatus 3 is developed, such model can be applied to the system without any modifications. If a user's portable electronic device is used as the personal authentication apparatus 3, the user need only use a single authentication units upon receiving a plurality of services from different servers 1.

Furthermore, since the individual authentication level data 415 are stored, the personal authentication system of the second embodiment can fairly distribute risk management cost to users by charging them what is calculated from the estimated value of losses upon illicit use of services, and the evaluation values of security levels of authentication units used by the users in addition to service use fees. That is, upon receiving services with an identical value, if an authentication units with low security level is used, a fee higher than that which is charged upon using an authentication units with higher security level is charged. In this way, various business models can be built.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An authentication apparatus comprising:
a plurality of authentication units;
an evaluation value setting unit configured to set a predetermined evaluation value for each of the plurality of authentication units;
a calculation unit configured to calculate a comprehensive evaluation value of an authentication process executed by at least one of the plurality of authentication units on the basis of the evaluation values set for the plurality of authentication units;
a selection unit configured to randomly select a combination of authentication units in which the comprehensive evaluation value calculated by the calculation unit exceeds a predetermined evaluation value, wherein the comprehensive evaluation value is the sum of the predetermined evaluation values set for the authentication units in the combination of authentication units; and
an authentication execution unit configured to execute an authentication process by the authentication units selected by the selection unit.

2. The apparatus according to claim 1, further comprising a condition setting unit configured to set a level of the comprehensive evaluation value required as a successful authentication condition for each user.

3. An authentication system which is applied to a network system formed by a server for offering various services, a terminal used to receive the services offered by the server, and an authentication apparatus for executing an authentication process for a user of the terminal in place of the server,
the terminal comprising:
a plurality of data acquisition units configured to acquire data used in the authentication process; and
a data transmission unit configured to send data acquired by at least one of the plurality of data acquisition units to the authentication apparatus, and
the authentication apparatus comprising:
a plurality of authentication units;
an evaluation value setting unit configured to set a predetermined evaluation value for each of the plurality of authentication units;
a calculation unit configured to calculate a comprehensive evaluation value of the authentication process executed by at least one of the plurality of authentication units on the basis of the evaluation values set for the plurality of authentication units;
a selection unit configured to randomly select a combination of authentication units in which the comprehensive evaluation value calculated by the calculation unit exceeds a predetermined evaluation value, wherein the comprehensive evaluation value is the sum of the predetermined evaluation values set for the authentication units in the combination of authentication units;

an authentication execution unit configured to execute an authentication process by the authentication units selected by the selection unit; and an informing unit configured to inform the terminal of an authentication result of the authentication execution unit.

4. The system according to claim 3, wherein the server comprises:

a condition setting unit configured to set a level of the comprehensive evaluation value required for the authentication process as a successful authentication condition for each user; and a charging unit configured to determine a charge amount for a service to be offered in accordance with the level of the comprehensive evaluation value for each user of the terminal, which is set by the condition setting unit.

5. The system according to claim 4, wherein the charging unit increases the charge amount for the service to be offered when the level of the comprehensive evaluation value is low, and decreases the charge amount for the service to be offered when the level of the comprehensive evaluation value is high.

* * * * *